United States Patent [19]

Geeck et al.

[11] Patent Number: 5,274,021

[45] Date of Patent: * Dec. 28, 1993

[54] CORROSION RESISTANT COATING INCLUDING TIN AND ZINC DUST PIGMENT

[76] Inventors: Thurlow Geeck, 20951 Laurelwood, Farmington, Mich. 48336; Donald D. Hurst, 568 Lakeside Dr., Birmingham, Mich. 48009

[*] Notice: The portion of the term of this patent subsequent to May 31, 2005 has been disclaimed.

[21] Appl. No.: 965,603

[22] Filed: Oct. 22, 1992

Related U.S. Application Data

[63] Continuation of Ser. No. 687,291, Apr. 18, 1991, abandoned.

[51] Int. Cl.$^5$ .......................... C08J 5/10; C08K 3/32; C08L 63/00
[52] U.S. Cl. .......................... 524/417; 524/430; 524/431; 524/432; 524/435; 524/449
[58] Field of Search ............... 524/417, 431, 430, 432, 524/435, 449

[56] References Cited

U.S. PATENT DOCUMENTS 4,748,194 5/1988 Geeck .................................. 523/427

Primary Examiner—Paul R. Michl
Assistant Examiner—U. K. Rajguru
Attorney, Agent, or Firm—Reising, Ethington, Barnard, Perry & Milton

[57] ABSTRACT

A corrosion resistant coating including by weight:
  A) 130 to 310 parts of a linear epoxy or phenoxy resin solution per thousand parts of coating;
  B) 30 to 620 parts of a powdered metal or dust selected from the group consisting essentially of zinc, basic zinc molybdate, calcium zinc molybdate/zinc phosphate; basic calcium zinc molybdate, basic zinc molybdate/phosphate, tin, mica, aluminum, black iron oxide, cadmium, stainless steel and alloys and blends thereof per thousand parts of coating;
  C) 13 to 70 parts of a suspension agent per thousand parts of coating for supporting components A and B in the coating;
  D) 6 to 20 parts of a thixotropic agent per thousand parts of coating for preventing gelling prior to heat cure for producing a thin uniform distribution on the substrate; and
  E) the balance of the coating consisting essentially of an organic solvent selected from the group including aliphatic hydrocarbon solvents, aromatic hydrocarbons, glycols, and acetates and blends thereof.

12 Claims, No Drawings

CORROSION RESISTANT COATING INCLUDING TIN AND ZINC DUST PIGMENT

This is a continuation of copending application Ser. No. 07/687,291 filed on Apr. 18, 1991 now abandoned.

TECHNICAL FIELD

This invention relates to coatings for metal substrates and more particularly to coatings for protecting a metal substrate from corrosion.

The present invention has particular use as a coating over metals such as tin plated steel, zinc and nickel combination on steel, hot dip galvanizing and electro-galvanizing steel, and cold rolled steel. Such metals are used in combination with the inventive coatings for exterior and interior of gas tanks.

BACKGROUND ART

Manufacturers are presently considering tin plated steel in the manufacture of gas tank containers for vehicles such as automobiles. The development of automotive tin coated gas tanks requires a coating for the exterior and interior of the containers. The exterior of the container must be protected from environmentally induced corrosion whereas the interior of the container must be resistant to corrosion induced by fuels contained therein. Additionally, the exterior coating must have a relatively hard surface. Although such a surface must be adaptive to welding and/or soldering additives, prior art coatings tended to decrease weldability.

The U.S. Pat. No. 4,391,855 to Geeck, issued Jul. 5, 1983, discloses resin coatings including cross linking agents. A secondary resin is added, such as melamine formaldehyde type cross linkers. Such linking agents required extended periods of time for cure as well as longer term baking or air drying. These resins were found to be too soft for exterior gas tank protection.

Gas tanks generally have lead and tin plate on their surface, as well as tin plated steel and zinc nickel electro-galvanized steel surfaces. Such surfaces are hard to coat, making adhesion of coatings to the surface a critical factor which must be considered in formulating a corrosion resistant coating. Although lower molecular weight resins disclosed in the prior art provide good adhesion to metal substrate and good formability, these resins result in coatings that are too soft for exterior gas tank protection. At the other extreme, higher molecular weight resins do not provide sufficient adhesion and do not provide sufficient formability.

The U.S. Pat. No. 4,748,194 to Geeck, discloses an improved protective coating for gas tank containers. This coating is well suited as a formulation for the exterior and interior of a gas tank. The invention utilized a specific mixture of linear epoxy and phenoxy resins to provide zinc rich coatings and charcoal zinc rich coatings for the exterior of the gas tank and aluminum coatings for the interior of the gas tank.

The present invention has been formulated for providing improved adhesion to new metals used in the gas tank art, such as tin plated steel. However, the present invention is further used as a coating on other metals, such as zinc and nickel combination on steel, hot dipped galvanizing and electro-galvanizing steel and cold rolled steel.

SUMMARY OF THE INVENTION

In accordance with the present invention, there is provided a corrosion resistant coating for application to a metal substrate the coating including by weight A) 130 to 310 parts per thousand of the linear epoxy or phenoxy resin solution, B) 30 to 620 parts per thousand of a powdered metal or dust selected from the group consisting essentially of zinc, tin, mica, aluminum, black iron oxide, cadmium, stainless steel and alloys and blends thereof, C) 13 to 70 parts per thousand of a suspension agent for suspending components A and B in the coatings, D) 6 to 20 parts per thousand of a thixotropic agent for preventing gelling prior to heat cure for producing a thin uniform distribution on the substrate, and E) the balance of the coating consisting essentially of an organic solvent selected from the group including aromatic hydrocarbons, glycols, and acetates and blends thereof.

DETAILED DESCRIPTION OF THE INVENTION

The corrosion resistant coating made in accordance with the present invention can be applied to metal substrates such as zinc and nickel combination on steel, such as that made by Bethlehem Steel, hot dipped galvanizing and electro-galvanizing steel, and cold rolled steel. However, the present invention finds particular significance in its unique ability to adhere to tin plated steel. Since tin plated steel is presently being considered for use in automotive gas tanks, the combination of corrosion resistant properties and adhesion as well as formability and weldability make the present invention particularly well suited for this use.

Coatings made in accordance with the present invention have been found to have excellent adhesion even after 336 hours salt spray on panels allowed to recover 5, 15, 30, 45, and 60 minutes when tested for adhesion by using pressure sensitive tape clear No. 610, made by 3M Corporation. There is no pick off of the paint from the tin plated steel. This characteristic of the present invention as well as it being formable for deep draws and weldable make it an excellent coating for automotive gas tank applications.

The coating made in accordance with the present invention includes 130 to 310 parts per thousand of a linear epoxy or phenoxy resin solution. The suitable commercially available linear epoxy and phenoxy resins are Arraldite 45-E-50, 488-E-32, 488-N-40 epoxy resin sold by Ciba-Geigy Corporation, and linear epoxy/phenoxy resins 373-PMA-65 as disclosed in U.S. Pat. Nos. 4,737,553 and 4,845,172 assigned to Ciba-Geigy Corporation. These resins all have excellent adhesion characteristics.

The coating can contain 30 to 620 parts per thousand of a powdered metal or dust selected from the group consisting essentially of zinc, tin, mica, aluminum, black iron oxide, cadmium, stainless steel and alloys and blends thereof. Preferably, the metal has an average particle size not greater than about 40 microns with a maximum individual particle size of not more than 100 microns, the metal being finely powdered metal or dust. For example, powdered zinc and cadmium may be purchased from Federated Metals Division of American Smelting and Refining Company. Powdered stainless steel can be purchased from U.S. Bronze Powders, Inc. Powdered aluminum can be purchased from Reynolds Metals Company. Powdered tin dust pigment can be purchased from Alcan Metals.

As shown in the following examples, the coating can be made as a zinc rich coating, a charcoal zinc rich coating, as well as various primers and aluminum rich coatings. Zinc rich coatings are preferred as hard exterior coatings because of the rust inhibition characteristics of the zinc. Interior coatings preferably would contain aluminum or stainless steel.

The coating includes 13 to 70 parts per thousand of a suspension agent for suspending the resin and metal components in solution. Examples of suspension agents are MPA-60, manufactured by Baker Castor Oil Company, N-11 polyethylene made by Eastman Chemical Corp.

A thixotropic agent is added for preventing gelling prior to heat cure for producing a thin uniform distribution on the substrate. Preferably, the composition includes 6 to 20 parts per thousand of the thixotropic agent. Preferred thixotropic agents are silane treated silica dioxide which is believed to also improve the salt spray corrosion resistance of the coating. Examples of thixotropic agents are TS-530, Carbosil M-5 both distributed by Cabot, Inc., Tullanox 292 and 500 manufactured by Tulco Corporation, and R-972 distributed by DeGussa Corporation.

The balance of the coating consists essentially of an organic solvent selected from the group including aliphatic hydrocarbon solvents, aromatic hydrocarbons, glycols, and acetates and blends thereof. Examples of aliphatic hydrocarbons solvents are mineral spirits, hexane, lactol spirits, and naphtha. Other examples include methyl ethyl ketone, methyl isobutyl ketone, dimethylformamide, and blends thereof. These are considered active organic solvents whereas the inactive inorganic solvents include the aromatic hydrocarbons, alcohols, aliphatic hydrocarbon solvents, and blends thereof.

In the preferred formulation of the present invention, the coating includes a mixture of tin metal pigment and zinc dust pigment. This combination of pigments was found to provide excellent adhesion to the tin plate steel resulting in no flaking or peeling off under excessive test conditions, such as salt spray conditions discussed above.

The coating may include 0.9 to 28 parts per thousand of a hydroscopic agent, such as calcium oxide. The hydroscopic agent is generally functioning as a water scavenger in the coating. Calcium in greater quantities, besides being a hydroscopic agent, improves adhesion to various surfaces such as tin plate, zinc-nickel complex electro-galvanized metal as well as other metals. The coating may include a second hydroscopic agent selected from the group consisting essentially of silica dioxide, barium oxide, and potassium chloride.

The coating can include 40 to 45 parts per thousand of Portland cement blended into the coating. The Portland cement, as well as the calcium oxide pigment or aluminum triphosphate act as inert pigments. The composition of Portland cement can include the following:

| CHEMICAL COMPOSITION | | PERCENT |
| --- | --- | --- |
| Silicon Dioxide | | 20.56 |
| Aluminum Oxide | | 5.36 |
| Ferric Oxide | | 2.57 |
| Calcium Oxide | | 62.62 |
| Magnesium Oxide | | 3.05 |
| Sulfur Trioxide | | 3.34 |
| Loss on Ignition | | 1.65 |
| Tricalcium Silicate | | 49 |
| Dicalcium Silicate | | 22 |
| Tricalcium Aluminate | | 10 |
| Tetracalcium Aluminoferrite | | 8 |
| Free Lime | | 0.64 |
| Total Alkali as $Na_2O$ | | 0.83 |
| Insoluble Residue | Less Than | 0.75 |

The above formulation is Type 1 Portland Cement manufactured by St. Marys Peerless Cement. The Portland Cement has been used for years in oil based paints and oil based primers for excellent adhesion on hot dip galvanized steel buildings and on galvanized gutters and down spouts on buildings with no loss of adhesion on those galvanized building component parts. (Quonset Hut Buildings by National Steel Fabricating Division use these paints on their hot dip zinc metal with no loss of adhesion and no flaking or peeling of paint for many years).

We have found that the Portland Cement pigment in zinc rich systems using the linear epoxy or phenoxy type resin has excellent adhesion and improved hardness as was noted on tin plated steel in salt spray for long periods of time in excess of 336 salt spray (5% salt solution). These findings were noted on tin plated steel, terne plate steel panels and on hot dip galvanized steel panels.

The coating can include 20 to 40 parts per thousand and a welding enhancer for enhancing the weldability of the coating once it is cured. The welding enhancer overcomes the effects of other additives which decrease weldability of the coating. Preferably, the welding enhancer is a di-ferro-phosphide or a nickel dust with or without the ferro-phosphide in combination with zinc and aluminum pigments.

The coating can include an additional 20 to 40 parts per thousand of a corrosion inhibitor for inhibiting corrosion of the coating once it is cured. An example is aluminum triphosphate, such as K-White No. 105 manufactured by Teikoku Kako Co. Ltd. of Osaka, Japan. The aluminum triphosphate also improves corrosion inhibition resistance in coated zinc rich paints. As discussed above, the aluminum triphosphate can also be used as an inert pigment in the formulation.

Aluminum triphosphate pigment adds to the zinc rich systems with improved blister resistance in salt spray with little or no blisters even after 336 hours in salt spray. U.S. Pat. No. 4,476,260 to Salensky, issued October, 1984, indicated large blisters in their zinc rich systems. However, no corrosion problems existed. Aluminum triphosphate pigment works very well in the present system providing very good blister resistance and controlled corrosion resistance (white rust).

The coating composition can include 0.5 to 1 part per thousand of a dispersing agent which assists in the dispersion of zinc rich paint. An example is LICA-97 ® made by Kenrich Petro Chemical, Inc. and is in a class of chemicals called neoalkoxytitanate coupling agents. About six different types are made for the market place which are as follows neoalkoxy, tri(n-amino) phenyl titanate (LICA-97 ®); neoalkoxy, tri(N-ethylenediamino) ethyl titanate (LICA-44 ®); neoalkoxy, tri(dictyl) prophosplato titanate (LICA-38 ®); neoalkoxy, tri(dictyl) phosphate titanate (LICA-12 ®);

neoalkoxy, tri(dodecyl) benzene - sulfonyl titanate, (LICA-09 ®); and neoalkoxy, trineodecaroxnl titanate, (LICA-01 ®). Neoalkoxy, tri (n-amino) phenyl titants. LICA-97 ® is the preferred dispersing agent for applicants' zinc rich system using linear epoxy or phenoxy resin system. In fact, very good compatability was found with applicants' grinding or dispersion technique for this linear epoxy system.

The coating can include 10 to 45 parts per thousand of a cross linking urethane resin. The cross linking urethane resin is selected from the group consisting of ketoxime blocked polyisocyanates, blocked aliphatic polyisocyanates, and blocked aromatic isocyanate prepolymers based on diisocyanate. Suitable urethane cross-linkers available from Mobay Chemical Company are Mondur HCB, Desmodur KL5-2544, BL 1260, KL 5-2371, and BL-3175A.

The following examples of compositions are illustrative of this invention and are not intended to limit the scope of the invention as defined by the appended claims.

EXAMPLE 1

Zinc Rich

| Parts by Weight | Material |
|---|---|
| 143.62 | Linear epoxy or phenoxy resin solution 65% solids by weight in propylene glycol mono methyl ether acetate. |
| 28.72 | Hydroscopic agent - calcium oxide (Warner Belle Mine, high in CaO 93%) |
| 43.09 | Suspension agent (MPA-60, Baker Castor Oil Co.). |
| 1.51 | Hydroscopic agent (Syloid ZN-1, Davidson Chem. Company). |
| 12.93 | Thixotropic agent (TS-530, Cabot Corp.) |
| 564.60 | Zinc Powder (#530 Zinc dust, St. Joseph Resource Co.). |
| 30.16 | Welding enhancer (Ferrophosphate HRS-2132, Hooker Chem. Co.). |
| 11.49 | Corrosion inhibitor Aluminum triphosphate, $AlH_2P_3O_{10}.2H_2O$, K-White #82 (Teikoku Kako Co. Ltd. - Osaka, Japan). |
| 12.93 | Ethylene Glycol solvent |

These materials were mixed at a speed of about 1000 RPM with a Cowles High Speed Dissolver until the mixture was heated to a temperature of about 140° F. The heated mixture was then pumped into a sandmill and milled to produce a homogenous mixture having a Hegman particle size grind rating of 5H. Thereafter, the homogeneous mixture was blended with the following materials to produce the complete composition.

| Parts by Weight | Material |
|---|---|
| 51.14 | SC 150 Aromatic Hydrocarbon Solvent. |
| 99.81 | Propylene glycol mono methyl ether acetate. |
| 1000.00 | |

EXAMPLE II

Zinc Rich

The following items were added in the order listed to a vessel under agitation using a Sherwin-Williams Batch Bead Mill.

| Parts by Weight | Material |
|---|---|
| 141.59 | Linear epoxy or phenoxy resin solution (373-PMA-65, Ciba-Geigy) 65% solids by weight in propylene glycol mono methyl ether acetate. |
| 42.48 | Suspension agent (MPA-60, Baker Castor Oil Co.) |
| 42.48 | Portland Cement - $3CaO-SiO_2$ (St. Marys Peerless Cement Co., Detroit, MI). |
| 1.49 | Hydroscopic agent (Syloid ZN-1, Davidson Chem. Company). |
| 12.74 | Thixotropic agent (TS-530, Cabot Corp.). |
| 556.60 | Zinc powder (UP-510 Zinc dust, Purity Zinc Dust Co. Ltd., Stony Creek, Ontario, Canada). |
| 29.73 | Welding enhancer (Ferrophosphate HRS-2132, Hooker Chem. Co.). |
| 11.33 | Corrosion inhibitor, Aluminum triphosphate, $AlH_2P_3O_{10}.2H_2O$, K-White No. 105 (Teikoku Kako Co. Ltd., Osaka, Japan). |
| 12.74 | Ethylene Glycol solvent |
| 70.79 | Propylene glycol mono methyl acetate (Ektasolve PM Acetate, Eastman Chemical Co.) |

These materials were dispersed about two and one-half hours on the Sherwin-Williams Bead Mill at vessel temperature not to exceed 120° F. and milled to produce a homogeneous mixture having a Hegman particle size grind rating of 6 H. Thereafter, the homogeneous mixture was blended with the following materials to produce the completed composition.

| Parts by Weight | Materials |
|---|---|
| 27.61 | Propylene glycol mono methyl ether acetate. |
| 50.42 | SC 150 Aromatic Hydrocarbon solvent. |
| 1000.00 | |

EXAMPLE III

Zinc Rich

The following items were added in the order listed to a vessel under agitation using a high speed Cowles Dissolver.

| Parts by Weight | Material |
|---|---|
| 133.45 | Linear epoxy or phenoxy resin solution (373-PMA-65, Ciba-Geigy) 65% solids by weight in propylene glycol mono methyl ether acetate. |
| 1.40 | Calcium Oxide pigment (Warner Belle Mine, high in CaO - 93% level). |
| .53 | Dispersing agent (LICA 97, Kenrich, Inc.) Neoalkoxy, tri(na-amino) phenyltitanate. |
| 40.03 | Suspension agent (MRT-1, Matteson- |

-continued

| Parts by Weight | Material |
|---|---|
| | Ridolfi, Inc.). |
| 1.40 | Hydroscopic agent (Syloid ZN-1, Davidson Chem. Company). |
| 12.01 | Thixoscopic agent (TS-530, Cabot Corp.). |
| 497.91 | Zinc Powder (UP-510 Zinc dust Purity Zinc Dust Co. Ltd., Stony Creek, Ontario, Canada). |
| 54.71 | Tin Dust pigment (#301, Alcan Metals). |
| 10.68 | Corrosion inhibitor, Aluminum triphosphate, $AlH_2P_3O_{10} \cdot 2H_2O$, K-White #105 (Teikoku Kako Co. Ltd., Osaka, Japan). |
| 120.10 | Propylene glycol mono methyl ether acetate. |
| 7.67 | Propylene glycol solvent. |

These materials were mixed at a speed of about 800 RPM with a Cowles High Speed Dissolver until the mixture was heated to a temperature of about 140° F. The heated mixture was then pumped into a sandmill and milled to produce a homogenous mixture having a Hegman particle size grind rating of 6 H. Thereafter, the homogeneous mixture was blended with the following materials to produce the completed composition.

| Parts by Weight | Material |
|---|---|
| 33.36 | Solvent - Methyl ethyl ketone. |
| 86.75 | Solvent - SC 150 Aromatic Hydrocarbon. |
| 1000.00 | |

EXAMPLE IV

Zinc Rich

The following items were added in the order listed to a vessel under agitation using a high speed Cowles Dissolver.

| Parts by Weight | Material |
|---|---|
| 133.56 | Linear epoxy or phenoxy resin solution (X6Z-373-PMA-65, Ciba-Geigy) 65% solids by weight in propylene glycol mono methyl ether acetate solvent. |
| .53 | Dispersing agent (LICA 97, Kenrich Inc.) |
| 1.40 | Hydroscopic agent - Calcium Oxide pigment (Warner Belle Mine, high in CaO-93%). |
| 40.06 | Suspernsion agent (MRT-1, Matteson-Ridolfi, Inc.). |
| 1.40 | Hydroscopic agent (Syloid ZN-1, Davidson Chem. Company). |
| 12.02 | Thixotropic agent (TS-530, Cabot Corp.). |
| 276.42 | Zinc dust pigment (UP-510 Purity Zinc Dust Co. Ltd., Stony Creek, Ontario, Canada). |
| 276.42 | Tin Dust pigment (#301, Alcan Metals). |
| 10.68 | Corrosion inhibitor, Aluminum triphosphate, $AlH_2P_3O_{10} \cdot 2H_2O$, K-White #105 (Teikoku Kako Co. Ltd., Osaka, Japan). |
| 119.65 | Propylene glycol mono methyl ether acetate solvent. |

-continued

| Parts by Weight | Material |
|---|---|
| 7.68 | Propylene Glycol solvent. |

These materials were mixed at a speed of about 1400 RPM with a Cowles High Speed Dissolver until the mixture was heated to a temperature of about 145° F. The heated mixture was then pumped into a sandmill and milled to produce a homogeneous mixture having a Hegman particle size grind rating of 6 H. Thereafter, the homogenous mixture was blended with the following materials to produce the completed composition.

| Parts by Weight | Material |
|---|---|
| 33.38 | Solvent - Methyl ethyl ketone. |
| 86.80 | Solvent - SC 150 Aromatic Hydrocarbon. |
| 1000.00 | |

EXAMPLE V

Zinc Rich

The following items were added in the order listed to a vessel under agitation using a high speed Cowles Dissolver.

| Parts by Weight | Material |
|---|---|
| 124.50 | Linear epoxy or phenoxy resin solutin (488-N-40, Ciba-Geigy) 40% solids by weight in methyl ethyl ketone. |
| 8.68 | Linear epoxy or phenoxy resin solution (373-PMA-65, Ciba-Geigy) 65% solids by weight in propylene glycol mono methyl ether acetate solvent. |
| .94 | Hydroscopic agent - Calcium Oxide (Warner Belle Mine, high in CaO - 93%). |
| .53 | Dispersing agent (LICA 97, Kenrich Inc.). Neoalkoxy, tri(na-amino) phenyl titanate. |
| 13.35 | Suspension agent (MPA-60X, Baker Castor Oil). |
| .94 | Hydroscopic agent (Syloid ZN-1, Davidson Chem. Company). |
| 20.03 | Thixotropic agent (TS-530, Cabot Corp.). |
| 620.82 | Zinc dust pigment (UP-510 Purity Zinc Dust Co. Ltd., Stony Creek, Ontario, Canada). |
| 10.68 | Corrosion inhibitor, Aluminum triphosphate, $AlH_2P_3O_{10} \cdot 2H_2O$, K-White #82 (Teikoku Kako Co. Ltd. - Osaka, Japan). |
| 7.67 | Propylene Glycol solvent. |
| 119.76 | Propylene glycol mono methyl ether acetate solvent. |

These materials were mixed at a speed of about 1300 RPM with a Cowles High Speed Dissolver until the mixture was heated to a temperature of about 149° F. The heated mixture was then pumped into a sandmill and milled to produce a homogeneous mixture having a Hegman particle size grind rating of 7 H. Thereafter, the homogeneous mixture was blended with the following material to produce the completed composition.

| Parts by Weight | Material |
|---|---|
| 72.10 | Solvent - Methyl ethyl ketone |
| 1000.00 | |

EXAMPLE VI

Charcoal Zinc Rich

The following items were added in the order listed to a vessel under agitation using a high speed Cowles Dissolver.

| Parts by Weight | Material |
|---|---|
| 123.07 | Linear epoxy or phenoxy resin solution (373-PMA-65, Ciba-Geigy) 65% solids by weight in propylene glycol mono methyl ether acetate. |
| 62.50 | Linear epoxy or phenoxy resin solution (488-PMA-32, Ciba-Geigy) 32% solids by weight in propylene glycol mono methyl ether acetate. |
| 25.60 | Suspension agent (MPA-60, Baker Castor Oil Co.). |
| 18.00 | Thixotropic agent (TS-530, Cabot Corp.) |
| 390.00 | Zinc Powder (#10 zinc dust, Federated Metals). |
| 20.00 | Welding enhancer (Ferrophosphate HRS-3095, Hooker Chem. Co.). |
| 7.00 | Welding enhancer - Nickel powder (#525 - 400 mesh, Novament Metals Co.). |
| 120.00 | Black Iron Oxide (#303-T, Mobay Chemical Co.). |
| 10.00 | Propylene Glycol solvent. |

These materials were mixed at a speed of about 900 RPM with a Cowles High Speed Dissolver until the mixture was heated to a temperature of about 135° F. The heated mixture was then pumped into a sandmill and milled to produce a homogenous mixture having a Hegman particle size grind rating of 6 H. Thereafter, the homogenous mixture was blended with the following materials to produce the completed composition.

| Parts by Weight | Material |
|---|---|
| 120.00 | Solvent - Methyl ethyl ketone. |
| 70.00 | Solvent - Mineral spirits, Aliphatic hydrocarbon solvent. |
| 33.00 | Solvent - Xylene, Aromatic hydrocarbon solvent. |
| 1000.00 | |

EXAMPLE VII

Medium Gray Primer

The following items were added in the order listed to a vessel under agitation using a high speed Cowles Dissolver.

| Parts by Weight | Material |
|---|---|
| 348.66 | Linear epoxy or phenoxy resin solution (86-184, Ciba-Geigy) 45.7% solids by weight in methyl ethyl ketone solvent. |
| 18.55 | Suspension agent (MPA-60, Baker Castor Oil Co.). |
| .99 | Dispersing agent (LICA 97, Kenrich Inc.). Neoalkoxy, tri(m-amino) phenyl titanate. |
| 222.55 | Zinc Powder (#530 Zinc dust, St. Joseph Resource Co.). |
| 37.09 | Welding enhancer - Nickel powder (#525 - 400 mesh, Novament Metals Co.). |
| 64.29 | Welding enhancer (Ferrophosphate HRS-2132, Hooker Chem. Co.). |
| 24.73 | Corrosion inhibitor, Aluminum triphosphate, $AlH_2P_3O_{10}.2H_2O$, K-White #82 (Teikoku Kako Co. Ltd. - Osaka, Japan). |
| 6.18 | Thixotropic agent (TS-530, Cabot Corp.) |
| 126.96 | Propylene glycol mono methyl ether acetate solvent. |

These materials were mixed at a speed of about 850 RPM with a Cowles High Speed Dissolver until the mixture was heated to a temperature of about 130° F. The heated mixture was then pumped into a sandmill and milled to produce a homogenous mixture having a Hegman particle size grind rating of 7 H. Thereafter, the homogenous mixture was blended with the following materials to produce the completed composition.

| Parts by Weight | Material |
|---|---|
| 150.00 | Solvent - propylene glycol mono methyl ether acetate. |
| 1000.00 | |

EXAMPLE VIII

Beige Primer

The following items were added in the order listed to a vessel under agitation using a high speed Cowles Dissolver.

| Parts by Weight | Material |
|---|---|
| 246.37 | Linear epoxy or phenoxy resin solution (373-PMA-65, Ciba-Geigy) 65% solids by weight in propylene glycol mono methyl ether acetate. |
| 1.65 | Hydroscopic agent - calcium oxide (Warner Belle Mine, high in CaO 93%). |
| 23.62 | Thixotropic agent (TS-530, Cabot Corp.) |
| 70.84 | Suspension agent (MPA-60, Baker Castor Oil Co.). |
| 35.42 | White pigment - Titanium Dioxide (R-900 grade, DuPont). |
| 283.39 | Rust Inhibiting pigment (ZNP Moly White pigment, Sherwin-Williams). |
| 17.72 | Mica pigment (12A, Franklin Minerals Pigment Co.). |
| 37.78 | Welding enhancer - Nickel powder (Nickel dust #525 - 400 mesh, Novament Metals Co.). |
| 12.99 | Solvent - Ethylene Glycol. |
| 133.13 | Solvent - Propylene glycol mono methyl ether acetate. |

These materials were mixed at a speed of about 1350 RPM with a Cowles High Speed Dissolver until the mixture was heated to a temperature of about 149° F. The heated mixture was then pumped into a sandmill and milled to produce a homogeneous mixture having a Hegman particle size grind rating of 6.75 H. Thereafter, the homogeneous mixture was blended with the following materials to produce the completed composition.

| Parts by Weight | Material |
|---|---|
| 66.13 | Solvent - SC 150 Aromatic hydrocarbon Solvent. |
| 70.96 | Desmodur BL3175A, Mobay Chemical Co. (75% solids by weight - a Ketoxime blocked aliphatic polyisocyanate). The BL3175 resin is 33.33 parts by weight into a solution 66.66 parts by weight of propylene glycol mono methyl ether acetate. |
| 1000.00 | |

EXAMPLE IX

Zinc Rich

The following items were added in the order listed to a vessel under agitation using a high speed Cowles Dissolver.

| Parts by Weight | Material |
|---|---|
| 144.00 | Linear epoxy or phenoxy resin solution (373-PMA-65, Ciba-Geigy) 65% solids by weight in propylene glycol mono methyl ether acetate. |
| 42.48 | Suspension agent (MPA-60, Baker Castor Oil Co.). |
| 42.48 | Portland Cement (3CaO—SiO2, St. Marys Peerless Cement Co., Detroit, Michigan). |
| 1.49 | Hydroscopic agent (syloid ZN-1, Davidson Chem. Company). |
| 12.74 | Thixotropic agent (TS-530, Cabot Corp.) |
| 556.60 | Zinc Powder (UP-510 Zinc dust, Purity Zinc Dust Co. Ltd. Stony Creek, Ontario, Canada). |
| 29.73 | Tin dust (#301, Alcan Metals). |
| 12.03 | Corrosion inhibitor, Aluminum triphosphate, AlH2P3O10.2H2O, K-White #82 (Teikoku Kako Co. Ltd., Osaka, Japan). |
| 12.74 | Solvent - Ethylene Glycol. |
| 64.71 | Solvent - Propylene glycol mono methyl ether acetate. |

These materials were mixed at a speed of about 750 RPM with a Cowles High Speed Dissolver until the mixture was heated to a temperature of about 125° F. The heated mixture was then pumped into a sandmill and milled to produce a homogenous mixture having a Hegman particle size grind rating of 7 H. Thereafter, the homogenous mixture was blended with the following materials to produce the completed composition.

| Parts by Weight | Material |
|---|---|
| 30.00 | Solvent - Propylene glycol mono methyl ether acetate. |
| 51.00 | Solvent - SC 150 Aromatic Hydrocarbon Solvent. |
| 1000.00 | |

EXAMPLE X

Aluminum Rich

The following items were added in the order listed to a vessel under agitation using a high speed Cowles Dissolver.

| Parts by Weight | Material |
|---|---|
| 456.15 | Linear epoxy or phenoxy resin solution (#565, Celanese) 21% solids by weight in propylene glycol mono methyl ether acetate. |
| 16.23 | Suspension agent (MPA-60, Baker Castor Oil Co.). |
| 11.36 | Thixotropic agent (TS-530, Cabot Corp.) |
| 162.26 | Aluminum powder (a non-leafing grade as a stain resistant paste, #8-232, Reynolds Metal Co.) 65% solids by weight in mineral spirits. |
| 31.55 | Welding enhancer - Nickel powder (#525 - 400 mesh Novament Metals Co.). |
| 207.34 | Solvent - Propylene glycol mono methyl ether acetate. |
| 10.82 | Solvent - Ethylene Glycol. |

These materials were mixed at a speed of about 1150 RPM with a Cowles High Speed Dissolver until the mixture was heated to a temperature of about 135° F. The heated mixture was then pumped into a sandmill and milled to produce a homogeneous mixture having a Hegman particle size grind rating of 5 H. Thereafter, the homogeneous mixture was blended with the following materials to produce the completed composition.

| Parts by Weight | Material |
|---|---|
| 14.14 | Desmodur BL-3175A, Mobay Chemical Co. (75% solids by weight - a Ketoxime blocked aliphatic polyisocyanate). |
| 90.15 | Solvent - Propylene glycol mono methyl ether acetate. |
| 1000.00 | |

EXAMPLE XI

Aluminum Rich

The following items were added in the order listed to a vessel under agitation using a high speed Cowles Dissolver.

| Parts by Weight | Material |
|---|---|
| 220.70 | Linear epoxy or phenoxy resin solution (373-PMA-65, Ciba-Geigy) 65% solids by weight in propylene glycol mono methyl ether acetate. |
| 89.62 | Linear epoxy or phenoxy resin solution (448-N-40, Ciba-Geigy) |

-continued

| Parts by Weight | Material |
|---|---|
| 44.46 | 40% solids in methyl ethyl ketone. Suspension agent (N-11 polyethylene, Eastman Chemical Corp.) with 13% solids weight in xylene. |
| 16.85 | Thixotropic agent (TS-530, Cabot Corp.) |
| 240.77 | Aluminum Powder (a non-leafing grade as a stain resistant paste #8-271, Reynolds Metals Co.) 65% solids by weight in mineral spirits. |
| 46.82 | Welding enhancer - Nickel powder (#525 - 400 mesh Novament Metals Co.). |
| 193.64 | Solvent - Propylene glycol mono methyl ether acetate. |
| 16.05 | Solvent - Ethylene Glycol. |

These materials were mixed at a speed of about 1250 RPM with a Cowles High Speed Dissolver until the mixture was heated to a temperature of about 145° F. The heated mixture was then pumped into a sandmill and milled to produce a homogeneous mixture having a Hegman particle size grind rating of 5 H. Thereafter, the homogeneous mixture was reduced in temperature to 80° F. and the following materials were added to produce the completed composition.

| Parts by Weight | Material |
|---|---|
| 43.70 | Desmodur BL-3175A, Mobay Chemical Co. (75% solids by weight - a Ketoxime blocked aliphatic polyisocyanate). |
| 87.39 | Solvent - Propylene glycol mono methyl ether acetate. |
| 1000.00 | |

The invention has been described in an illustrative manner, and it is to be understood that the terminology which has been used is intended to be in the nature of words of description rather than of limitation.

Obviously many modifications and variations of the present invention are possible in light of the above teachings. It is, therefore, to be understood that within the scope of the appended claims, the invention may be practiced otherwise than as specifically described.

What is claimed is:

1. A corrosion resistant coating for application to a metal substrate, said coating including by weight:
   A) 130 to 310 parts of a linear epoxy or phenoxy resin solution per thousand parts of coating;
   B) 30 to 620 parts of a powdered metal or dust per thousand parts of coating selected from the group consisting essentially of zinc, basic zinc molybdate, phosphate, calcium zinc molybdate/zinc phosphate, basic calcium zinc molybdate, tin, mica, aluminum, black iron oxide, cadmium, stainless steel and alloys and blends thereof;
   C) 13 to 70 parts of a suspension agent per thousand parts of coating for supporting components A and B in said coating;
   D) 6 to 20 parts of a thixotropic agent per thousand parts of coating for preventing gelling prior to heat cure for producing a thin uniform distribution on the substrate; and
   E) the balance of said coating consisting essentially of an organic solvent selected from the group including aliphatic hydrocarbon solvents, aromatic hydrocarbons, glycols, and acetates and blends thereof.

2. A coating as set forth in claim 1 including a mixture of tin metal pigment and zinc dust pigment.

3. A coating as set forth in claim 1 further including 0.9 to 29 parts calcium oxide as a hydroscopic agent per thousand parts of coating.

4. A coating as set forth in claim 3 further including a second hydroscopic agent for scavenging water from said coating.

5. A coating as set forth in claim 1 further including 40 to 45 parts of portland cement blended into said coating per thousand parts of coating.

6. A coating as set forth in claim 1 further including 20 to 40 parts of a welding enhancer per thousand parts of coating for enhancing the weldability of the coating once it is cured.

7. A coating as set forth in claim 1 further including 20 to 40 parts of a corrosion inhibitor per thousand parts of coating for inhibiting corrosion of said coating once it is cured.

8. A coating as set forth in claim 1 including 0.5 to 1 part of a dispersing agent per thousand parts of coating.

9. A coating as set forth in claim 1 further 10 to 45 parts of a cross linking urethane resin per thousand parts of coating.

10. A coating as set forth in claim 9 wherein said cross linking urethane resin is selected from the group consisting of ketoxime blocked polyisocyanates, blocked aliphatic polyisocyanate, and blocked aromatic isocyanate prepolymer based on diisocyanate.

11. A corrosion resistant coating for application to a metal substrate, said coating including by weight:
   A) 130 to 310 parts of a linear epoxy or phenoxy resin solution per thousand parts of coating;
   B) 30 to 620 parts of a blend of tin metal pigment and zinc dust pigment per thousand parts of coating;
   C) 13 to 70 parts of a suspension agent per thousand parts of coating for supporting components A and B in said coating;
   D) 6 to 20 parts of a thixotropic agent per thousand parts of coating for preventing gelling prior to heat cure for producing a thin uniform distribution on the substrate; and
   E) the balance of said coating consisting essentially of an organic solvent selected from the group including aliphatic hydrocarbon solvents, aromatic hydrocarbons, glycols, and acetates and blends thereof.

12. A corrosion resistant coating for application to a metal substrate, said coating including by weight:
   A) 130 to 310 parts of a linear epoxy or phenoxy resin solution per thousand parts of coating;
   B) 30 to 620 parts of a blend of tin metal pigment and zinc dust pigment per thousand parts of coating;
   C) 13 to 70 parts of a suspension agent per thousand parts of coating for supporting components A and B in said coating;
   D) 6 to 20 parts of a thixotropic agent per thousand parts of coating for preventing gelling prior to heat cure for producing a thin uniform distribution on the substrate;
   E) the balance of said coating consisting essentially of an organic solvent selected from the group including aliphatic hydrocarbon solvents, aromatic hydrocarbons, glycols, and acetates and blends thereof; and
   F) a coating as set forth in claim 1 further including 40 to 45 parts of portland cement blended per thousand parts of coating.

* * * * *